US011450888B2

(12) United States Patent
Nakagawa et al.

(10) Patent No.: US 11,450,888 B2
(45) Date of Patent: Sep. 20, 2022

(54) NONAQUEOUS ELECTROLYTE AND NONAQUEOUS ELECTROLYTE ENERGY STORAGE DEVICE (71) Applicants: GS Yuasa International Ltd., Kyoto (JP); THE DOSHISHA, Kyoto (JP)

(72) Inventors: Hiroe Nakagawa, Kyoto (JP); Katsuyuki Takahashi, Kyoto (JP); Minoru Inaba, Kyotanabe (JP); Takayuki Doi, Kyotanabe (JP); Ryo Matsumoto, Kyotanabe (JP)

(73) Assignees: GS Yuasa International Ltd., Kyoto (JP); THE DOSHISHA, Kyoto (JP)

( * ) Notice: Subject to any disclaimer, the term of this patent is extended or adjusted under 35 U.S.C. 154(b) by 314 days.

(21) Appl. No.: 16/637,849

(22) PCT Filed: Aug. 10, 2018

(86) PCT No.: PCT/JP2018/030052
§ 371 (c)(1),
(2) Date: Feb. 10, 2020

(87) PCT Pub. No.: WO2019/031598
PCT Pub. Date: Feb. 14, 2019

(65) Prior Publication Data
US 2020/0251782 A1 Aug. 6, 2020

(30) Foreign Application Priority Data

Aug. 10, 2017 (JP) .............................. JP2017-155305
Nov. 1, 2017 (JP) .............................. JP2017-212100

(51) Int. Cl.
H01M 4/00 (2006.01)
H01M 10/0569 (2010.01)
(Continued)

(52) U.S. Cl.
CPC ....... *H01M 10/0569* (2013.01); *H01M 4/131* (2013.01); *H01M 4/366* (2013.01);
(Continued)

(58) Field of Classification Search
CPC ....... H01M 10/0569; H01M 2004/028; H01M 4/366; H01M 10/052; H01M 10/0568; H01M 4/131; Y02E 60/10
See application file for complete search history.

(56) References Cited

U.S. PATENT DOCUMENTS

2003/0113636 A1  6/2003 Sano et al.
2008/0014497 A1  1/2008 Sano et al.
(Continued)

FOREIGN PATENT DOCUMENTS

EP  2365573 A2  9/2011
EP  2650959 A1  10/2013
(Continued)

OTHER PUBLICATIONS

Extended European Search Report (EESR) dated Apr. 6, 2021 issued in the corresponding European Patent Application No. 18845170.2.
(Continued)

Primary Examiner — Cynthia H Kelly
Assistant Examiner — Monique M Wills
(74) Attorney, Agent, or Firm — Rankin, Hill & Clark LLP (57) ABSTRACT One aspect of the present invention is a nonaqueous electrolyte for an energy storage device comprising: an alkali metal salt; a first aprotic organic solvent coordinating to an alkali metal ion in the alkali metal salt, and not including a fluorine atom; a second aprotic organic solvent including a fluorine atom; and an additive comprising a polar group and a group including a fluorine atom, wherein a content of the
(Continued)

alkali metal salt is no less than 0.9 mol/kg and less than 2 mol/kg, a content of the first aprotic organic solvent with respect to the content of the alkali metal salt in terms of a molar ratio is no less than 0.7 and no greater than 4, and a content of the second aprotic organic solvent with respect to a total amount of the first aprotic organic solvent, the second aprotic organic solvent and the additive is no less than 40% by volume.

12 Claims, 2 Drawing Sheets

(51) Int. Cl.
<table>
<tr><td>H01M 4/131</td><td>(2010.01)</td></tr>
<tr><td>H01M 4/36</td><td>(2006.01)</td></tr>
<tr><td>H01M 4/505</td><td>(2010.01)</td></tr>
<tr><td>H01M 4/525</td><td>(2010.01)</td></tr>
<tr><td>H01M 10/0525</td><td>(2010.01)</td></tr>
<tr><td>H01M 10/0567</td><td>(2010.01)</td></tr>
<tr><td>H01M 4/02</td><td>(2006.01)</td></tr>
</table>

(52) U.S. Cl.
CPC .......... *H01M 4/505* (2013.01); *H01M 4/525* (2013.01); *H01M 10/0525* (2013.01); *H01M 10/0567* (2013.01); *H01M 2004/021* (2013.01); *H01M 2004/028* (2013.01)

(56) References Cited

U.S. PATENT DOCUMENTS

<table>
<tr><td>2011/0159379 A1</td><td>6/2011</td><td>Matsumoto et al.</td></tr>
<tr><td>2013/0146808 A1*</td><td>6/2013</td><td>Endo .................. C01G 45/1228<br>252/182.1</td></tr>
<tr><td>2014/0322615 A1</td><td>10/2014</td><td>Uehara et al.</td></tr>
<tr><td>2015/0118581 A1</td><td>4/2015</td><td>Takase et al.</td></tr>
<tr><td>2015/0126549 A1*</td><td>5/2015</td><td>Pierre ..................... A61P 29/00<br>514/451</td></tr>
<tr><td>2015/0140443 A1</td><td>5/2015</td><td>Takahashi et al.</td></tr>
<tr><td>2015/0171468 A1</td><td>6/2015</td><td>Sasaki et al.</td></tr>
<tr><td>2015/0171477 A1</td><td>6/2015</td><td>Takahashi et al.</td></tr>
<tr><td>2015/0303521 A1</td><td>10/2015</td><td>Sasaki et al.</td></tr>
<tr><td>2016/0099486 A1</td><td>4/2016</td><td>Noguchi et al.</td></tr>
<tr><td>2017/0162910 A1</td><td>6/2017</td><td>Katou et al.</td></tr>
<tr><td>2017/0222270 A1</td><td>8/2017</td><td>Uehara et al.</td></tr>
<tr><td>2017/0256368 A1*</td><td>9/2017</td><td>Raman .................. H01G 11/84</td></tr>
<tr><td>2017/0352908 A1</td><td>12/2017</td><td>Noguchi et al.</td></tr>
<tr><td>2018/0108935 A1</td><td>4/2018</td><td>Noguchi et al.</td></tr>
</table>

FOREIGN PATENT DOCUMENTS

<table>
<tr><td>JP</td><td>9-306538 A</td><td>11/1997</td></tr>
<tr><td>JP</td><td>10-116630 A</td><td>5/1998</td></tr>
<tr><td>JP</td><td>2002-25606 A</td><td>1/2002</td></tr>
<tr><td>JP</td><td>2004-95522 A</td><td>3/2004</td></tr>
<tr><td>JP</td><td>2012-94491 A</td><td>5/2012</td></tr>
<tr><td>JP</td><td>2013-20713 A</td><td>1/2013</td></tr>
<tr><td>JP</td><td>2013-239451 A</td><td>11/2013</td></tr>
<tr><td>JP</td><td>2013-254605 A</td><td>12/2013</td></tr>
<tr><td>JP</td><td>2014-35866 A</td><td>2/2014</td></tr>
<tr><td>JP</td><td>2014-116078 A</td><td>6/2014</td></tr>
<tr><td>JP</td><td>2015-18707 A</td><td>1/2015</td></tr>
<tr><td>JP</td><td>2015-56241 A</td><td>3/2015</td></tr>
<tr><td>JP</td><td>2015-195180 A</td><td>11/2015</td></tr>
<tr><td>JP</td><td>2016-103468 A</td><td>6/2016</td></tr>
<tr><td>JP</td><td>2017-208215 A</td><td>11/2017</td></tr>
<tr><td>WO</td><td>2014/133161 A1</td><td>9/2014</td></tr>
<tr><td>WO</td><td>2014/171518 A2</td><td>10/2014</td></tr>
<tr><td>WO</td><td>2016/088837 A1</td><td>6/2016</td></tr>
<tr><td>WO</td><td>2016/143293 A1</td><td>9/2016</td></tr>
</table>

OTHER PUBLICATIONS

International Search Report (ISR) dated Sep. 11, 2018 filed in PCT/JP2018/030052.

Written Opinion of the International Searching Authority (ISA) dated Sep. 11, 2018 filed in PCT/JP2018/030052.

* cited by examiner

FIG. 1

F I G. 2

NONAQUEOUS ELECTROLYTE AND NONAQUEOUS ELECTROLYTE ENERGY STORAGE DEVICE

TECHNICAL FIELD

The present invention relates to a nonaqueous electrolyte and a nonaqueous electrolyte energy storage device.

BACKGROUND ART

Nonaqueous electrolyte secondary batteries typified by lithium ion secondary batteries are frequently used for automobiles, electronic instruments such as personal computers and communication terminals, and the like, owing to their energy density being so great. The nonaqueous electrolyte secondary battery generally includes: a pair of electrodes electrically separated by a separator; and a nonaqueous electrolyte (electrolyte solution) interposed between these electrodes, and is configured to permit charge-discharge through a transfer of ions between both electrodes. As a nonaqueous electrolyte energy storage device other than the nonaqueous electrolyte secondary batteries, capacitors such as lithium ion capacitors and electric double-layer capacitors have also prevailed extensively.

In general, the nonaqueous electrolyte of the nonaqueous electrolyte energy storage device contains an organic solvent that is a nonaqueous solvent, and an electrolyte salt dissolved in this organic solvent. Nonaqueous electrolyte energy storage devices in which a nonaqueous electrolyte containing an electrolyte salt at a high concentration is used for improving various characteristics of the nonaqueous electrolyte energy storage devices have been developed (see Patent Documents 1 to 3).

PRIOR ART DOCUMENTS

Patent Documents

Patent Document 1: Japanese Unexamined Patent Application, Publication No. 2016-103468
Patent Document 2: Japanese Unexamined Patent Application, Publication No. 2004-095522
Patent Document 3: PCT International Publication No. 2010/030008

SUMMARY OF THE INVENTION

Problems to be Solved by the Invention

According to a nonaqueous electrolyte energy storage device in which a nonaqueous electrolyte containing an electrolyte salt at a high concentration is used as described above, a capacity retention rate during a charge-discharge cycle is improved to some extent. However, even in a case in which the nonaqueous electrolyte containing an electrolyte salt at a high concentration is used, the effect of improving the capacity retention rate during the charge-discharge cycle is not sufficient under a condition that allows a working potential of the positive electrode to be noble, such as, for example, allowing a maximum upper limit potential of a positive electrode at the time of charge to become no less than 4.4 V (vs. Li/Li$^+$). Under current circumstances in which a nonaqueous electrolyte energy storage device having a higher energy density is in demand, there is a desire for development of a nonaqueous electrolyte energy storage device having a high capacity retention rate even in a case in which charge-discharge is conducted under a condition that allows the working potential of the positive electrode to be noble.

The present invention was made in view of the foregoing circumstances, and an object of the present invention is to provide a nonaqueous electrolyte capable of increasing a capacity retention rate during a charge-discharge cycle even in a case in which charge-discharge is conducted under a condition that allows a working potential of a positive electrode to be noble, and a nonaqueous electrolyte energy storage device that includes this nonaqueous electrolyte.

Means for Solving the Problems

One aspect of the present invention made for solving the aforementioned problems is a nonaqueous electrolyte for an energy storage device comprising: an alkali metal salt; a first aprotic organic solvent coordinating to an alkali metal ion in the alkali metal salt, and not including a fluorine atom; a second aprotic organic solvent including a fluorine atom; and an additive comprising a polar group and a group including a fluorine atom, wherein a content of the alkali metal salt is no less than 0.9 mol/kg and less than 2 mol/kg, a content of the first aprotic organic solvent with respect to the content of the alkali metal salt in terms of a molar ratio is no less than 0.7 and no greater than 4, and a content of the second aprotic organic solvent with respect to a total amount of the first aprotic organic solvent, the second aprotic organic solvent and the additive is no less than 40% by volume.

Another aspect of the present invention is a nonaqueous electrolyte energy storage device comprising the nonaqueous electrolyte of the one aspect described above.

Effects of the Invention

According to the present invention, a nonaqueous electrolyte capable of increasing a capacity retention rate during a charge-discharge cycle even in a case in which charge-discharge is conducted under a condition that allows a working potential of a positive electrode to be noble, and a nonaqueous electrolyte energy storage device that includes this nonaqueous electrolyte can be provided.

DESCRIPTION OF EMBODIMENTS

The nonaqueous electrolyte for an energy storage device according to one embodiment of the present invention comprises: an alkali metal salt; a first aprotic organic solvent (hereinafter, may be also merely referred to as "first solvent") coordinating to an alkali metal ion in the alkali metal salt, and not including a fluorine atom; a second aprotic organic solvent (hereinafter, may be also merely referred to as "second solvent") including a fluorine atom; and an additive comprising a polar group and a group including a fluorine atom, wherein a content of the alkali metal salt is no less than 0.9 mol/kg and less than 2 mol/kg, a content of the first aprotic organic solvent with respect to the content of the alkali metal salt in terms of a molar ratio is no less than 0.7 and no greater than 4, and a content of the second aprotic organic solvent with respect to a total amount of the first aprotic organic solvent, the second aprotic organic solvent and the additive is no less than 40% by volume.

The nonaqueous electrolyte of the one embodiment of the present invention is capable of increasing a capacity retention rate during a charge-discharge cycle of the nonaqueous electrolyte energy storage device even in a case in which charge-discharge is conducted under a condition that allows a working potential of a positive electrode to be noble. Although the reason for this feature is uncertain, the following reasons are supposed.

(1) In general nonaqueous electrolytes, an organic solvent coordinates to an alkali metal ion, thereby leading to dissolution of an alkali metal salt. In a case in which the aprotic organic solvent (first solvent) not including a fluorine atom is used as the organic solvent, coordination of a plurality of electron donating polar groups of the first solvent to one alkali metal ion generally results in a stable state. For example, in a case in which the first solvent is an organic solvent having one carbonate group as the electron donating polar group, coordination of four carbonate groups to one alkali metal ion typically results in a stable state and thus four molecules of the first solvent are coordinated. The first solvent which has coordinated to the alkali metal ion, i.e., having solvated, has enhanced resistance to oxidization in comparison with a first solvent not having solvated. Therefore, since the first solvent not having solvated, i.e., the first solvent not having sufficient resistance to oxidization, is present in a large amount in general nonaqueous electrolytes having comparatively low concentrations of alkali metal salts, the nonaqueous electrolyte energy storage device that includes the same is accompanied by a low capacity retention rate during the charge-discharge cycle (see Comparative Examples 1 and 4 in EXAMPLES, described later).

(2) To the contrary, due to a smaller amount of the first solvent not having solvated in a nonaqueous electrolyte containing an alkali metal salt at a higher concentration, the nonaqueous electrolyte energy storage device that includes the same tends to be improved capacity retention rate during the charge-discharge cycle (see Comparative Examples 2, 3 and 5). However, in this case, owing to a high concentration of the alkali metal salt, a viscosity of the nonaqueous electrolyte increases, thereby leading to be slow diffusion of the alkali metal ion. This phenomenon is supposed to be one reason for insufficiency of the effect of improving the capacity retention rate of the nonaqueous electrolyte energy storage device that includes the same even when a high concentration of the alkali metal salt is contained in the nonaqueous electrolyte.

(3) In this regard, dilution of a nonaqueous electrolyte prepared by dissolving an alkali metal salt at a high concentration in an aprotic organic solvent (first solvent) such as a carbonate not including a fluorine atom with an aprotic organic solvent (second solvent) including a fluorine atom such as a fluorinated ether or a fluorinated carbonate is conceived. In this case, the first solvent is coordinated to the alkali metal ion more preferentially than the second solvent, leading to a decrease in the first solvent not having solvated, and thus a state with favorable resistance to oxidization is maintained. When the second solvent including a fluorine atom is used, resistance to oxidization of the second solvent itself is so high that the nonaqueous electrolyte has favorable resistance to oxidization even if the second solvent is not solvated with the alkali metal ion. Therefore, such a nonaqueous electrolyte is expected to improve the capacity retention rate of the nonaqueous electrolyte energy storage device that includes the same. However, even the nonaqueous electrolyte energy storage device that includes such a nonaqueous electrolyte containing the alkali metal salt, the first solvent and the second solvent cannot be accompanied by a sufficient capacity retention rate (see Comparative Examples 6 to 8). This insufficiency is supposed to result from an influence of, for example, poor miscibility of the second solvent with the first solvent.

(4) Thus, dilution with an additive including a polar group and a group including a fluorine atom such as a fluorinated phosphoric acid ester, in place of the second solvent is considered. Since such an additive itself has superior resistance to oxidization, the nonaqueous electrolyte has favorable resistance to oxidization even if not having solvated with the alkali metal ion. Further, the additive is capable of coordinating to the alkali metal ion and thus is miscible with the first solvent. However, in this case, the viscosity of the nonaqueous electrolyte becomes so high that the diffusion of the alkali metal ion is retarded. Therefore, similarly to the feature described above in (2), the nonaqueous electrolyte energy storage device that includes such a nonaqueous electrolyte fails to be accompanied by a sufficiently improved capacity retention rate (see Comparative Example 9).

(5) In connection with the features described above in (1) to (4), the nonaqueous electrolyte according to the one embodiment of the present invention is supposed to provide a high capacity retention rate of the nonaqueous electrolyte energy storage device that includes the same for the following reasons. First, the alkali metal salt is dissolved through the coordination of the first solvent not including a fluorine atom to the alkali metal ion constituting the alkali metal salt. Owing to the content of the first solvent with respect to the content of the alkali metal salt in terms of a molar ratio being no less than 0.7 and no greater than 4, a sufficiently small amount of the first solvent not having solvated is contained, and the first solvent has favorable resistance to oxidization. In the nonaqueous electrolyte of the one embodiment of the present invention, the additive including a polar group and a group including a fluorine atom is contained in addition to the second solvent, which is contained as a dilution solvent. The second solvent and the additive are highly resistant to oxidization even if not having solvated. Moreover, the polar group included in the additive has high affinity to the first solvent, whereas the group including a fluorine atom included in the additive has high affinity to the second solvent, which has a fluorine atom. Therefore, in the nonaqueous electrolyte of the one embodiment of the present invention, the additive is present around the first solvent, which coordinates to the alkali metal ion, and serves in imparting miscibility between the first solvent and the second solvent. More specifically, the additive is speculated to function as a surfactant or miscibility accelerator between the first solvent and the second solvent. Because the content of the second solvent is no less than 40% by volume, the viscosity of the nonaqueous electrolyte is sufficiently decreased. Accordingly, it is speculated that the capacity retention rate of the nonaqueous electrolyte energy storage device that includes the nonaqueous electrolyte of the one embodiment of the invention is increased through attaining both high solubility of the alkali metal salt and ease of diffusion of the same in the nonaqueous electrolyte of the one embodiment of the invention.

Whether or not each of a variety of organic solvents has coordinated to the alkali metal ion constituting the alkali metal salt can be ascertained by a measurement on a Raman spectrum of the nonaqueous electrolyte. Specifically, coordination of the organic solvent to the alkali metal ion results in a shift of a Raman band inherent to a group that coordinates to the organic solvent, toward a higher wavenumber region. For example, when propylene carbonate coordinates to the alkali metal ion, a Raman band inherent to a ring-deformation band of propylene carbonate observed at around 712 $cm^{-1}$ shifts to around 721 $cm^{-1}$. In other words, when the organic solvent is mixed with the alkali metal salt, in a case of finding a Raman band shifted toward a higher-wavenumber region as compared with a Raman band of the organic solvent alone, this organic solvent is concluded to have coordinated to the alkali metal ion constituting the alkali metal salt. It is not necessary for the entirety of the first solvent in the nonaqueous electrolyte to coordinate to the alkali metal ion; it is acceptable if at least a part of the first solvent coordinates to the alkali metal ion. More specifically, even in a case in which a Raman band representing a state of coordination to the alkali metal ion and a Raman band representing a state of a failure to coordinate to the alkali metal ion are both observed, the first solvent is defined to have coordinated to the alkali metal ion.

It is preferred that the polar group includes a phosphoric acid ester group, a nitric acid ester group or a sulfuric acid ester group. In a case in which the polar group of the additive includes such a group, the capacity retention rate can be further increased. This advantage is speculated to result from, for example, allowing a miscibility-imparting performance by the additive as described above to be more favorably exerted.

The first aprotic organic solvent preferably includes the carbonate not including a fluorine atom. The capacity retention rate of the nonaqueous electrolyte energy storage device can be further increased hereby.

The first aprotic organic solvent preferably includes a cyclic carbonate not including a fluorine atom. Among carbonates not including a fluorine atom, by virtue of comparatively superior resistance to oxidization, the cyclic carbonate enables the capacity retention rate of the nonaqueous electrolyte energy storage device to be further increased.

The first aprotic organic solvent preferably includes propylene carbonate; it is also preferable for the first aprotic organic solvent to be propylene carbonate. Since propylene carbonate is superior in resistance to oxidization, the capacity retention rate of the nonaqueous electrolyte energy storage device can be further increased.

The second aprotic organic solvent preferably includes a fluorinated linear carbonate, a fluorinated ether or a combination thereof. Since these solvents are superior in resistance to oxidization, the capacity retention rate of the nonaqueous electrolyte energy storage device can be further increased.

The additive preferably includes the fluorinated phosphoric acid ester. When the nonaqueous electrolyte of the one embodiment of the invention includes the fluorinated phosphoric acid ester, the capacity retention rate of the nonaqueous electrolyte energy storage device that includes the same can be further increased.

The content of the additive with respect to the total amount of the first aprotic organic solvent, the second aprotic organic solvent and the additive is preferably no less than 5% by volume and less than 50% by volume. When the content of the additive falls within the above range, the capacity retention rate of the nonaqueous electrolyte energy storage device that includes the same can be further increased.

It is preferred that the nonaqueous electrolyte of the one embodiment of the present invention does not substantially include ethylene carbonate. In a case in which the nonaqueous electrolyte does not substantially include ethylene carbonate, which has comparatively inferior resistance to oxidization among carbonates not including a fluorine atom, the capacity retention rate of the nonaqueous electrolyte energy storage device that includes the same can be further increased.

The content of the first aprotic organic solvent with respect to the content of the alkali metal salt in terms of a molar ratio is highly preferably no less than 1 and no greater than 4. When the content of the first aprotic organic solvent with respect to the content of the alkali metal salt falls within the above range, charge-discharge performance such as the capacity retention rate of the nonaqueous electrolyte can be further increased.

A nonaqueous electrolyte energy storage device according to another embodiment of the present invention includes the nonaqueous electrolyte of the one embodiment of the present invention. The nonaqueous electrolyte energy storage device is capable of increasing a capacity retention rate during a charge-discharge cycle even in a case in which charge-discharge is conducted under a condition that allows the working potential of the positive electrode to be noble.

It is preferred that the nonaqueous electrolyte energy storage device further includes a positive electrode which includes $Li_xNi_\alpha Co_\beta Mn_\gamma M_{(1-\alpha-\beta-\gamma)}O_2$ (wherein M represents a metal element other than Ni, Mn or Co; $0<x\le1.2$; $0.3\le\alpha\le0.8$; $0\le\beta\le0.4$; $0\le\gamma\le0.4$; and $(\alpha+\beta+\gamma)\le1$) having a layered $\alpha$-$NaFeO_2$-type crystal structure. By using such a positive electrode in combination with the nonaqueous electrolyte of the one embodiment of the invention, the nonaqueous electrolyte energy storage device can be accompanied by a superior capacity retention rate.

Hereinafter, the nonaqueous electrolyte and the nonaqueous electrolyte energy storage device according to the embodiments of the present invention are described in detail.

Nonaqueous Electrolyte

The nonaqueous electrolyte of the one embodiment of the present invention contains an alkali metal salt, a first solvent, a second solvent and an additive. The nonaqueous electrolyte is used in an energy storage device.

Alkali Metal Salt

The alkali metal salt is constituted by an alkali metal ion and an anion. The alkali metal salt is exemplified by a lithium salt, a sodium salt, a potassium salt and the like, and the lithium salt is preferred. Examples of the lithium salt include: inorganic lithium salts such as $LiPF_6$, $LiPO_2F_2$, $LiBF_4$, $LiPF_2(C_2O_4)_2$, $LiClO_4$ and $LiN(SO_2F)_2$; organic lithium salts having a fluorinated hydrocarbon group such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F_5)_3$; and the like.

Of these lithium salts, the inorganic lithium salts are preferred, $LiBF_4$ or $LiPF_6$ is more preferred, and $LiBF_4$ is still more preferred. $LiBF_4$ has particularly low solubility in the second solvent. Therefore, in the case in which $LiBF_4$ is used, the effect by the additive of imparting miscibility between the first solvent and the second solvent is particularly effectively exhibited. Due to the particularly low solubility of $LiBF_4$ in the second solvent, a viscosity-reducing function by the second solvent is also exhibited sufficiently. Thus, use of $LiBF_4$ as the alkali metal salt enables the capacity retention rate to be further increased.

It is preferred that the alkali metal salt is dissolved substantially entirely. In such a case, the charge-discharge performance such as the capacity retention rate of the nonaqueous electrolyte energy storage device can be more sufficiently improved. In a case in which the alkali metal salt, which is undissolved, is present, clouding of and/or solid precipitation in the nonaqueous electrolyte will be visually confirmed. The solubility of the alkali metal salt is adjusted by, for example, a proportion of mixing of the first solvent, the second solvent and the additive. For example, an increase in the content of the first solvent leads to a higher solubility of the alkali metal salt. When the second solvent is contained excessively, the solubility of the alkali metal salt is lowered, thereby allowing the alkali metal salt, which is undissolved, to be more likely to be generated.

It is preferred that the alkali metal salt forms an ion pair or a cluster in the nonaqueous electrolyte. Furthermore, it is preferred that substantially all alkali metal salts form ion pairs or clusters in the nonaqueous electrolyte. In such an instance, even in a case in which charge-discharge is conducted under a condition that allows the working potential of the positive electrode to be noble, the capacity retention rate of the nonaqueous electrolyte energy storage device during the charge-discharge cycle can be further increased. Although the reason for this feature is uncertain, it is supposed to result from, for example, more improved resistance to oxidization of the anion constituting the alkali metal salt, in the case of forming the ion pair or the cluster from the alkali metal salt. For example, an increase of the content of the alkali metal salt with respect to the first solvent is capable of leading to an increase in a rate of forming the ion pair or the cluster from the alkali metal salt in the nonaqueous electrolyte. Meanwhile, in the case of the content of the alkali metal salt with respect to the first solvent being small, the alkali metal salt is likely to be present in a state in which a large portion is completely dissociated.

Whether or not the alkali metal salt has formed the ion pair or the cluster can be ascertained by a measurement on a Raman spectrum or FT-IR spectrum of the nonaqueous electrolyte. Specifically, a Raman band inherent to or a position of an absorption peak on a FT-IR spectrum of the anion constituting the alkali metal salt shifts in a case of the alkali metal salt being dissociated into the alkali metal ion and the anion, as compared with a case of forming the ion pair or the cluster. For example, a Raman band observed around a region inherent to a $BF_4$ anion forming $LiBF_4$ shifts stepwise from around 797 $cm^{-1}$ in a solid state of $LiBF_4$ or around 766 $cm^{-1}$ in a completely dissociated state, to around 774 or 783 $cm^{-1}$ when the ion pair or the cluster is formed. In this respect, when a shift of the Raman band or the absorption peak on the FT-IR spectrum to a wavenumber between the solid alkali metal salt and the alkali metal salt in the completely dissociated state can be ascertained, formation of an ion pair or a cluster from the alkali metal salt is decided, and when a ratio of a peak area representing a completely dissociated state to a peak area representing a state of formation of an ion pair or a cluster falls within a range of 10:90 to 0:100, formation of an ion pair or a cluster from substantially all alkali metal salts is decided. First, a Raman spectrum is measured and if a shift is found on the Raman spectrum, formation of an ion pair or cluster is decided based on the finding. In a case in which the shift is not found on the Raman spectrum, an FT-IR spectrum is measured and if a shift can be found on the FT-IR spectrum, formation of an ion pair or a cluster from the alkali metal salt is decided. If the shift cannot be found in either the Raman spectrum and the FT-IR spectrum, failure of formation of the ion pair or cluster is decided.

The lower limit of the content of the alkali metal salt in the nonaqueous electrolyte is 0.9 mol/kg. When the lower limit of the content of the alkali metal salt is no less than the lower limit, a sufficient amount of the alkali metal ion can be present, thereby enabling favorable charge-discharge to be conducted. The content of the alkali metal salt is typically less than 2 mol/kg, preferably no greater than 1.6 mol/kg, and more preferably no greater than 1.2 mol/kg. When the content of the alkali metal salt is less than 2 mol/kg, an increase in the viscosity of the nonaqueous electrolyte is inhibited, and the capacity retention rate of the nonaqueous electrolyte energy storage device that includes the same can be increased. In the nonaqueous electrolyte, the content, i.e., a usage amount, of the alkali metal salt is small, thereby also enabling a production cost to be controlled. Making the content of the alkali metal salt less than 2 mol/kg facilitates provision of a state of the entirety of the contained alkali metal salt being sufficiently dissolved.

First Solvent

The first solvent coordinates to the alkali metal ion constituting the alkali metal salt, and is an aprotic organic solvent not including a fluorine atom. In other words, the alkali metal salt is dissolved in this first solvent. However, a part of the alkali metal salt may be dissolved in a component other than the first solvent. A solubility of the alkali metal salt in the first solvent at 25° C. is preferably no less than 2.0 mol/kg.

The first solvent is exemplified by polar solvents such as a carbonate, an ester, an ether, an amide, a sulfone, a lactone and a nitrile, and a carbonate is preferred. Among them, the first solvent preferably includes the carbonate not including a fluorine atom, and more preferably is the carbonate not including a fluorine atom. Exemplary carbonates include a linear carbonate and a cyclic carbonate. The first solvent may have a substituent other than a fluorine atom, but is preferably unsubstituted.

Examples of the linear carbonate not including a fluorine atom include diethyl carbonate (DEC), dimethyl carbonate (DMC), ethylmethyl carbonate (EMC), diphenyl carbonate and the like, and of these, DMC is preferred.

Examples of the cyclic carbonate not including a fluorine atom include ethylene carbonate (EC), propylene carbonate (PC), butylene carbonate (BC), vinylene carbonate (VC), vinylethylene carbonate (VEC), styrene carbonate, catechol carbonate, 1-phenylvinylene carbonate, 1,2-diphenyl vinylene carbonate and the like, and of these, PC is preferred.

Among carbonates not having fluorine atoms that are candidates to be the first solvent, a cyclic carbonate not including a fluorine atom is preferred, and PC is more preferred. These solvents are superior in resistance to oxidization, and therefore the capacity retention rate during the charge-discharge cycle can be further increased.

In the nonaqueous electrolyte, it is preferred that EC is not substantially contained. For example, the upper limit of the content of EC with respect to the total amount of the first solvent, the second solvent and the additive is preferably 1% by volume, and more preferably 0.1% by volume.

The lower limit of the content of the first solvent with respect to the content of the alkali metal salt in terms of a molar ratio is typically 0.7, preferably 1, and more preferably 1.2. When the content of the first solvent is no less than the lower limit, a sufficient amount of the alkali metal salt can be dissolved without permitting the presence of the alkali metal salt not dissolved in the nonaqueous electrolyte, thereby enabling the charge-discharge performance of the nonaqueous electrolyte energy storage device that includes the same to be enhanced. The upper limit of the content of the first solvent is typically 4, preferably 3, and more preferably 2. When the content of the first solvent is no greater than the upper limit, coordination of most of the first solvent to the alkali metal ion is enabled, and the resistance to oxidization of the first solvent can be enhanced. In order to further improve the effects described above, the content of the first solvent with respect to the content of the alkali metal salt may be less than 1, and further, may be no greater than 0.9 or no greater than 0.8.

The lower limit of the content of the first solvent with respect to the total amount of the first solvent, the second solvent and the additive is preferably 5% by volume, more preferably 8% by volume, and still more preferably 10% by volume. When the content of the first solvent is no less than the lower limit, a sufficient amount of the alkali metal salt can be dissolved in the nonaqueous electrolyte without permitting the presence of the alkali metal salt not dissolved in the nonaqueous electrolyte, thereby enabling the charge-discharge performance of the nonaqueous electrolyte energy storage device that includes the same to be enhanced. The upper limit of the content of the first solvent is preferably 40% by volume, more preferably 30% by volume and still more preferably 20% by volume, and may be 10% by volume. When the content of the first solvent is no greater than the upper limit, elevation of the viscosity of the nonaqueous electrolyte is inhibited, and the capacity retention rate of the nonaqueous electrolyte energy storage device that includes the same can be further increased.

Second Solvent

The second solvent is an aprotic organic solvent including a fluorine atom. The second solvent dilutes the first solvent, which dissolves the alkali metal salt, thereby reducing the viscosity of the nonaqueous electrolyte, and thus has a function of increasing diffusibility of the alkali metal ion. The alkali metal ion is not substantially solvated with the second solvent, and the second solvent does not substantially dissolve the alkali metal salt. A solubility of the alkali metal salt in the second solvent at 25° C. is preferably less than 0.1 mol/kg.

The second solvent is exemplified by a fluorinated carbonate, a fluorinated ether, a fluorinated hydrocarbon, and the like. Of these, it is preferred that the fluorinated carbonate, the fluorinated ether or a combination thereof is contained, and it is particularly preferable that the fluorinated carbonate is contained. The second solvent is preferably the fluorinated carbonate, the fluorinated ether or a combination thereof, and is particularly preferably the fluorinated carbonate. As the fluorinated carbonate, fluorinated linear carbonate and fluorinated cyclic carbonates are exemplified, and a fluorinated linear carbonate is preferred. Due to such a second solvent having particularly potent resistance to oxidization and the like, the nonaqueous electrolyte has favorable resistance to oxidization and thus, for example, the capacity retention rate of the nonaqueous electrolyte energy storage device that includes the same can be further increased.

The fluorinated linear carbonate is exemplified by a compound represented by $R^a$—O—CO—O—$R^b$, wherein $R^a$ represents a fluorinated alkyl group; and $R^b$ represents an alkyl group or a fluorinated alkyl group. $R^b$ represents preferably a fluorinated alkyl group. The number of carbon atoms of $R^a$ or $R^b$ is preferably 1 to 3, and more preferably 2, for each.

Examples of the fluorinated linear carbonate include (2-fluoroethyl)methyl carbonate, (2,2-difluoroethyl)methyl carbonate, (2,2,2-trifluoroethyl)methyl carbonate, ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, bis(2,2,2-trifluoroethyl) carbonate, (3,3,3-trifluoropropyl) methyl carbonate, (2,2,3,3-tetrafluoropropyl)methyl carbonate, (2,2,3,3,3-pentafluoropropyl)methyl carbonate, ethyl-(3,3,3-trifluoropropyl) carbonate, ethyl-(2,2,3,3-tetrafluoropropyl) carbonate, ethyl-(2,2,3,3,3-pentafluoropropyl) carbonate, (3,3,3-trifluoropropyl)propyl carbonate, (2,2,3,3-tetrafluoropropyl)propyl carbonate, (2,2,3,3,3-pentafluoropropyl)propyl carbonate, bis(3,3,3-trifluoropropyl) carbonate, bis(2,2,3,3-tetrafluoropropyl) carbonate, bis(2,2,3,3,3-pentafluoropropyl) carbonate, and the like. Of these, (2,2,2-trifluoroethyl)methyl carbonate or bis(2,2,2-trifluoroethyl) carbonate is preferred, and bis(2,2,2-trifluoroethyl) carbonate is more preferred.

Examples of the fluorinated cyclic carbonate include fluoroethylene carbonate, difluoroethylene carbonate, trifluoroethylene carbonate, tetrafluoroethylene carbonate, (fluoromethyl)ethylene carbonate, (difluoromethyl)ethylene carbonate, (trifluoromethyl)ethylene carbonate, bis(fluoromethyl)ethylene carbonate, bis(difluoromethyl)ethylene carbonate, bis(trifluoromethyl)ethylene carbonate, (fluoroethyl)ethylene carbonate, (difluoroethyl)ethylene carbonate, (trifluoroethyl)ethylene carbonate, 4-fluoro-4-methylethylene carbonate, 4,4-difluoro-5-methylethylene carbonate, 4,5-difluoro-4,5-dimethylethylene carbonate, and the like. Of these, a fluorinated ethylene carbonate such as fluoroethylene carbonate is preferred, and fluoroethylene carbonate is more preferred.

As the second solvent, it is also preferred that the fluorinated linear carbonate and the fluorinated cyclic carbonate are used in combination. In this case, a mixing ratio (fluorinated linear carbonate:fluorinated cyclic carbonate) of the fluorinated linear carbonate to the fluorinated cyclic carbonate is preferably 60:40 to 99:1, and more preferably 75:25 to 95:5.

The fluorinated ether may be either a fluorinated linear ether or a fluorinated cyclic ether. Examples of the fluorinated ether include di(2-fluoroethyl) ether, di(2,2-difluoroethyl) ether, di(2,2,2-trifluoroethyl) ether, ethyl-2-fluoroethyl ether, ethyl-2,2,2-trifluoroethyl ether, ethyl-1,1,2,2-tetrafluoroethyl ether, 2-fluoroethyl-2,2,2-trifluoroethyl ether, 1,1,2,2-tetrafluoroethyl-2,2,2-trifluoroethyl ether, 1,1,2,2-tetrafluoroethyl-2,2,3,3-tetrafluoropropyl ether, 1,1,2,2-tetrafluoroethyl-2,2,3,3,3-pentafluoropropyl ether, 2,2,3,3-tetrafluoropropyl-1,1,2,3,3,3-hexafluoropropyl ether, and the like.

The fluorinated hydrocarbon may be a fluorinated aliphatic hydrocarbon such as a fluorinated alkane or a fluorinated cycloalkane, or may be a fluorinated aromatic hydrocarbon such as hexafluorobenzene.

The lower limit of the content of the second solvent with respect to the total amount of the first solvent, the second solvent and the additive is typically 40% by volume, preferably 45% by volume and more preferably 50% by volume, and may be 60% by volume or 70% by volume. When the content of the second solvent is no less than the lower limit, the viscosity of the nonaqueous electrolyte can be sufficiently lowered, and the nonaqueous electrolyte energy storage device that includes the same can exhibit a favorable capacity retention rate. The upper limit of the content of the second solvent is, for example, preferably 80% by volume, more preferably 70% by volume, and still more preferably 60% by volume. When the content of the second solvent is no greater than the upper limit, sufficient solubility of the alkali metal salt in the nonaqueous electrolyte can be ensured, and the charge-discharge performance of the nonaqueous electrolyte energy storage device that includes the same can be improved, for example.

Additive

The additive is a compound comprising a polar group and a group including a fluorine atom. The additive is speculated to function as a surfactant or miscibility accelerator that imparts miscibility between the first solvent and the second solvent. As defined herein, the second solvent is not included in the additive. It is preferred that the solubility of the alkali metal salt in the additive at 25° C. is less than the solubility in the first solvent and greater than the solubility in the second solvent.

The aforementioned group including a fluorine atom is typically a fluorinated hydrocarbon group. The fluorinated hydrocarbon group is exemplified by fluorinated aliphatic hydrocarbon groups such as a fluorinated alkyl group, a fluorinated alkenyl group, a fluorinated alkynyl group and a fluorinated cycloalkyl group, and fluorinated aromatic hydrocarbon groups. Of these, the fluorinated aliphatic hydrocarbon group is preferred, and the fluorinated alkyl group is more preferred. The additive is preferably a compound consisting of only the fluorinated alkyl group and the polar group (a phosphoric acid ester group, a nitric acid ester group, a sulfuric acid ester group or the like).

Examples of the fluorinated alkyl group include a fluoromethyl group, a difluoromethyl group, a trifluoromethyl group, a 2,2,2-trifluoroethyl group, a perfluoroethyl group, a 3,3,3-trifluoropropyl group, a perfluoropropyl group, a perfluorobutyl group, a perfluoropentyl group, and the like. As the fluorinated alkyl group, a group that includes a trifluoromethyl group ($-CF_3$) is preferred. In a case in which the fluorinated alkyl group includes such a group, the function of imparting miscibility between the first solvent and the second solvent described above may be effectively exhibited.

The lower limit of the number of carbon atoms of the group including a fluorine atom is preferably 1, and more preferably 2. The upper limit of the number of carbon atoms is preferably 5, and more preferably 3. The lower limit of the number of fluorine atoms of the group including a fluorine atom is typically 1, and preferably 3. The upper limit of the number of fluorine atoms is preferably 11, and more preferably 7.

The additive may have one or a plurality of the group including a fluorine atom, and has preferably no less than 2 and more preferably no less than 3 groups including a fluorine atom described above. The upper limit of the number of the group including a fluorine atom included in the additive may be, for example, 5 or 4, and the number of the group including a fluorine atom is preferably the same as a valency of the polar group included in the additive. In particular, in a case in which the additive includes one polar group, the number of the group including a fluorine atom is preferably the same as the valency of the polar group. Specifically, for example, in a case in which the polar group is a phosphoric acid ester group having a valency of 3, the number of the group including a fluorine atom is preferably 3.

The polar group included in the additive is exemplified by a hydroxy group, an amino group, a carboxy group, a carboxylic acid ester group, a phosphoric acid ester group, a nitric acid ester group, a sulfuric acid ester group, and the like. The polar group is, for example, a group having a hetero atom, and is preferably a group other than a carbonate group ($-O-CO-O-$) or an ether group ($-O-$). By virtue of such a group, the additive can be sufficiently polar in terms of a molecular structure, thereby resulting in the effects of the invention being more sufficiently achieved.

Among the polar groups, the phosphoric acid ester group, the nitric acid ester group or the sulfuric acid ester group is preferred, and the phosphoric acid ester group is more preferred. In the case in which the additive includes such a group, the aforementioned function of imparting miscibility between the first solvent and the second solvent is more effectively exhibited. In particular, the phosphoric acid ester group is capable of bonding to three groups including a fluorine atom described above, and in the case in which such an additive is used, the function as a surfactant is more effectively exhibited.

It is preferred that the additive includes a fluorinated phosphoric acid ester, and it is more preferred that the additive is the fluorinated phosphoric acid ester. The fluorinated phosphoric acid ester is preferably a fluoroalkylphosphoric acid ester, and more preferably a trisfluoroalkylphosphoric acid ester.

Examples of the fluorinated phosphoric acid ester include tris(2,2-difluoroethyl) phosphate, tris(2,2,3,3-tetrafluoropropyl) phosphate, tris(2,2,3,3,4,4-hexafluorobutyl) phosphate, tris(1H,1H,5H-octafluoropentyl) phosphate, tris(2,2,2-trifluoroethyl) phosphate, tris(2,2,3,3,3-pentafluoropropyl) phosphate, tris(1H,1H-perfluorobutyl) phosphate, tris(1H,1H-perfluoropentyl) phosphate, and the like. The fluorinated phosphoric acid ester is preferably tris(2,2,2-trifluoroethyl) phosphate (TFEP).

The lower limit of the content of the additive with respect to the total amount of the first solvent, the second solvent and the additive is preferably 5% by volume, more preferably 10% by volume, and still more preferably 20% by volume. When the content of the additive is no less than the lower limit, the function of the additive, as a surfactant, is sufficiently exhibited, and the capacity retention rate can be further increased. The upper limit of the content of the additive is preferably less than 50% by volume and more preferably no greater than 40% by volume, and may be no greater than 30% by volume or no greater than 20% by volume. When the content of the additive is less than 50% by volume, the capacity retention rate of the nonaqueous electrolyte energy storage device that includes the same can be further increased by inhibition of an increase in the viscosity, and the like.

Other Components

The nonaqueous electrolyte may contain component(s) (other components) other than the alkali metal salt, the first solvent, the second solvent and the additive within a range not leading to impairments of the effects of the invention. The other components are exemplified by various types of additives which may be contained in nonaqueous electrolytes for general energy storage devices. In this regard, the upper limit of the content of the of the other component(s) with respect to the total amount of the first solvent, the second solvent and the additive can be preferably 10% by volume, more preferably 1% by volume, and still more preferably 0.1% by volume. In a case in which the content of the other component(s) is great, this/these component(s) may affect the solubility, the viscosity, the resistance to oxidization and the like of the alkali metal salt, and thus may influence the capacity retention rate of the nonaqueous electrolyte energy storage device that includes the same.

The first aprotic organic solvent, the second aprotic organic solvent, and the additive described hereinabove may be used each alone of one type, or as a mixture of two or more types thereof.

A preparation procedure of the nonaqueous electrolyte is not particularly limited. The nonaqueous electrolyte may be prepared by, for example, mixing the first solvent, the second solvent and the additive in a certain proportion to give a mixed solvent, and adding the aforementioned alkali metal salt to this mixed solvent. Also, the nonaqueous electrolyte may be prepared by: dissolving the alkali metal salt in the first solvent; and adding the second solvent and the additive thereto.

Nonaqueous Electrolyte Energy Storage Device

A nonaqueous electrolyte energy storage device according to another embodiment of the present invention includes a positive electrode, a negative electrode and a nonaqueous electrolyte. As one example of the nonaqueous electrolyte energy storage device, a nonaqueous electrolyte secondary battery will be described in the following. The positive electrode and the negative electrode form an electrode group by, in general, being alternately overlaid through being laminated or wound, with a separator interposed therebetween. This electrode group is placed in a case and this case is filled with the nonaqueous electrolyte. In the nonaqueous electrolyte secondary battery, the nonaqueous electrolyte of the one embodiment of the present invention described above is used as the nonaqueous electrolyte. The nonaqueous electrolyte is interposed between the positive electrode and the negative electrode. As the aforementioned case, a well-known metal case, resin case or the like which may be typically used as a case for a nonaqueous electrolyte secondary battery may be employed. Examples of the metal case include a stainless steel case, an aluminum case, and the like.

Positive Electrode

The positive electrode includes a positive electrode substrate, and a positive active material layer provided directly or via an intermediate layer on the positive electrode substrate.

The positive electrode substrate is electrically conductive. As a material of the substrate, a metal such as aluminum, titanium, tantalum or stainless steel, or an alloy thereof is used. Of these, in light of a balance of potential resistance, electric conductivity and cost, aluminum or an aluminum alloy is preferred. The mode of shaping the positive electrode substrate is exemplified by a foil, a vapor deposition film and the like, and is preferably a foil in view of the cost. More specifically, an aluminum foil is preferred as the positive electrode substrate. Regarding aluminum or the aluminum alloy, A1085P, A3003P and the like prescribed in JIS-H-4000 (2014) may be exemplified.

The intermediate layer is a covering layer of a surface of the positive electrode substrate and decreases contact resistance between the positive electrode substrate and the positive active material layer, owing to including electrically conductive particles such as carbon particles. A constitution of the intermediate layer is not particularly limited and can be formed, for example, from a composition containing a resin binder and electrically conductive particles. The term "electrically conductive" as referred to means that a volume resistivity measured in accordance with JIS-H-0505 (1975) is no greater than $10^7$ Ω·cm, whereas the term "electrically nonconductive" means that the volume resistivity is greater than $10^7$ Ω·cm.

The positive active material layer is formed from a positive electrode composite as generally referred to, containing a positive active material. The positive electrode composite that forms the positive active material layer contains, as needed, optional components such as a conductive agent, a binder (binding agent), a thickening agent, a filler and the like.

The positive active material is exemplified by a lithium-transition metal composite oxide having an α-NaFeO$_2$-type crystal structure, a lithium transition metal oxide having a spinel-type crystal structure, a polyanionic compound, and the like. Examples of the lithium-transition metal composite oxide having an α-NaFeO$_2$-type crystal structure include a composite oxide represented by Li$_x$MeO$_y$, wherein Me represents at least one type of a transition metal, and the like. Examples of the lithium transition metal oxide having a spinel-type crystal structure include Li$_x$Mn$_2$O$_4$, Li$_x$Ni$_\alpha$Mn$_{(2-\alpha)}$O$_4$, and the like. The polyanionic compound is exemplified by a polyanionic compound represented by Li$_w$Me$_x$(XO$_y$)$_z$ and the like, wherein Me represents at least one type of a transition metal, and X represents, for example, P, Si, B, V or the like. Examples of the polyanionic compound represented by Li$_w$Me$_x$(XO$_y$)$_z$ include LiFePO$_4$, LiMnPO$_4$, LiNiPO$_4$, LiCoPO$_4$, Li$_3$V$_2$(PO$_4$)$_3$, Li$_2$MnSiO$_4$, Li$_2$CoPO$_4$F, and the like. The polyanion or the elements in these compounds may be partially substituted with other elements or anion species. In the positive active material layer, these compounds may be used alone of one type, or as a mixture of two or more types thereof.

It is preferred that the positive active material includes Li$_x$Ni$_\alpha$Co$_\beta$Mn$_\gamma$M$_{(1-\alpha-\beta-\gamma)}$O$_2$ (wherein M represents a metal element other than Ni, Mn or Co; $0<x\leq1.2$; $0.3\leq\alpha\leq0.8$; $0\leq\beta\leq0.4$; $0\leq\gamma\leq0.4$; and $(\alpha+\beta+\gamma)\leq1$) having a layered α-NaFeO$_2$-type crystal structure, and it is more preferred that the positive active material is Li$_x$Ni$_\alpha$Co$_\beta$Mn$_\gamma$M$_{(1-\alpha-\beta-\gamma)}$O$_2$ described above. The denotation γ is preferably greater than 0, more preferably no less than 0.1, still more preferably no less than 0.2, and even more preferably no less than 0.25. In a case in which the positive active material containing Mn is used, elution of Mn from the positive active material into the nonaqueous electrolyte is likely to occur in general, and thus the capacity retention rate tends to be low. However, according to the nonaqueous electrolyte energy storage device of the embodiment of the present invention, even in a case in which the positive active material containing Mn is used, a high capacity retention rate is enabled because the nonaqueous electrolyte as described above is employed. Although the reason for this feature is not certain, since an organic solvent capable of solvating to an Mn ion hardly exists in the nonaqueous electrolyte, it is speculated that elution of Mn from the positive active material into the nonaqueous electrolyte can be inhibited. Since Mn is a comparatively inexpensive metal, an attempt to reduce production cost or the like can be made by using the positive active material containing Mn.

The lower limit of the sum $(\alpha+\beta+\gamma)$ described above is preferably 0.8, more preferably 0.9, and still more preferably 0.99. More specifically, the sum $(\alpha+\beta+\gamma)$ may be substantially 1. The lower limit of α may be 0.33. The upper limit of β may be 0.33. The upper limit of γ may also be 0.33.

The conductive agent is not particularly limited as long as it is an electrically conductive material. Such a conductive agent is exemplified by carbon black such as natural or artificial graphite, furnace black, acetylene black and Ketjen black, a metal, electrically conductive ceramics, and the like. With respect to the form, the conductive agent may be powdery, fibrous, or the like.

Examples of the binder (binding agent) include: thermoplastic resins such as a fluorocarbon resin (polytetrafluoroethylene (PTFE), polyvinylidene fluoride (PVDF), etc.), polyethylene, polypropylene and polyimide; elastomers such as ethylene-propylene-diene rubber (EPDM), sulfonated EPDM, styrene-butadiene rubber (SBR) and fluorine rubber; polysaccharide macromolecules; and the like.

Examples of the thickening agent include: carboxymethylcellulose (CMC); and polysaccharide macromolecules such as methylcellulose. In a case in which the thickening agent includes a functional group capable of reacting with lithium, it is preferred that this functional group is deactivated beforehand by methylation or the like.

The filler is not particularly limited as long as it does not adversely affect battery performance. Examples of a principal component of the filler include polyolefins such as polypropylene and polyethylene, silica, alumina, zeolite, glass, and the like.

Negative Electrode

The negative electrode includes a negative electrode substrate, and a negative active material layer provided directly or via an intermediate layer on the negative electrode substrate. The intermediate layer may have a configuration similar to that of the intermediate layer of the positive electrode.

The negative electrode substrate may have a configuration similar to that of the positive electrode substrate. As a material, a metal such as copper, nickel, stainless steel, or nickel-plated steel is used, or an alloy thereof, and copper or a copper alloy is preferred. In other words, the negative electrode substrate is preferably a copper foil. The copper foil is exemplified by a rolled copper foil, an electrolyzed copper foil, and the like.

The negative active material layer is formed from a negative electrode composite, as generally referred to, containing a negative active material. The negative electrode composite that forms the negative active material layer contains, as needed, optional components such as a conductive agent, a binder (binding agent), a thickening agent, a filler and the like. The optional components such as the conductive agent, the binding agent, the thickening agent and the filler used may be similar to those for the positive active material layer.

As a negative active material, typically, a material capable of absorbing and releasing a lithium ion may be used. Specific examples of the negative active material include: metals or metalloids such as Si or Sn; metal oxides or semimetal oxides such as Si oxide or Sn oxide; polyphosphoric acid compounds; carbon materials such as graphite, nongraphitic carbon (readily graphitizable carbon or hardly graphitizable carbon); and the like.

Furthermore, the negative electrode composite (negative active material layer) may also contain a representative nonmetal element such as B, N, P, F, Cl, Br or I; a representative metal element such as Li, Na, Mg, Al, K, Ca, Zn, Ga or Ge; or a transition metal element such as Sc, Ti, V, Cr, Mn, Fe, Co, Ni, Cu, Mo, Zr, Ta, Hf, Nb or W.

Separator

As a material of the separator, for example, a woven fabric, a nonwoven fabric, a porous resin film or the like may be used. Of these, in light of strength, a porous resin film is preferred, and in light of a liquid-retaining property of the nonaqueous electrolyte, a nonwoven fabric is preferred. As a principal component of the separator, in light of strength, for example, a polyolefin such as polyethylene or polypropylene is preferred, and in light of oxidative degradation resistance, for example, a polyimide, an aramid or the like is preferred. These resins may be used as a composite.

Maximum Upper Limit Potential

Since the nonaqueous electrolyte described above is used in the nonaqueous electrolyte energy storage device (nonaqueous electrolyte secondary battery) of the other embodiment of the present invention, the capacity retention rate during the charge-discharge cycle in a case in which charge-discharge is conducted under a condition that allows the working potential of the positive electrode to be noble is high. Therefore, the nonaqueous electrolyte energy storage device can be suitably used at a high operation voltage. For example, the nonaqueous electrolyte energy storage device can be used with the positive electrode being charged to a maximum upper limit potential of no less than 4.4 V (vs. Li/Li$^+$), and the maximum upper limit potential of this positive electrode may be 4.5 V (vs. Li/Li$^+$) or 4.6 V (vs. Li/Li$^+$) or greater. Due to the maximum upper limit potential of the positive electrode being great in this way, an increase in capacity can be sought. The upper limit of the maximum upper limit potential of the positive electrode may be, for example, 5.0 V (vs. Li/Li$^+$), and may be 4.8 V (vs. Li/Li$^+$). The maximum upper limit potential of the positive electrode may be a positive electrode potential at a charge termination voltage in common use. The term "in common use" as referred to herein means a case in which the nonaqueous electrolyte energy storage device is used under a charge condition having been recommended or designated for the nonaqueous electrolyte energy storage device. In a case in which a charger for the nonaqueous electrolyte energy storage device is provided, the term "in common use" means a case in which the nonaqueous electrolyte energy storage device is used with the charger being adopted. For example, in a nonaqueous electrolyte energy storage device that includes graphite as a negative active material, provided that a charge termination voltage is 4.5 V, a positive electrode potential is about 4.6 V (vs. Li/Li$^+$), although this may depend on its design.

Manufacturing Method of Nonaqueous Electrolyte Energy Storage Device

A manufacturing method of the nonaqueous electrolyte energy storage device is not particularly limited. The nonaqueous electrolyte energy storage device may be manufactured by using the nonaqueous electrolyte described above. The manufacturing method includes, for example: a step of producing a positive electrode; a step of producing a negative electrode; a step of preparing a nonaqueous electrolyte; a step of forming an electrode group by alternately overlaying a positive electrode and a negative electrode with a separator interposed therebetween through laminating or winding; a step of placing the positive electrode and the negative electrode (the electrode group) in a container; and a step of filling the container with the nonaqueous electrolyte. After the filling, a port for filling is sealed and thus the nonaqueous electrolyte energy storage device can be obtained.

Other Embodiments

The present invention is not limited to the foregoing embodiments, and in addition to the modes described above, the present invention can be put into practice with variously altered or modified modes. For example, in the positive electrode and the negative electrode, the intermediate layer may not be provided, and these electrodes may not have distinct layer structures. For example, the positive electrode and the negative electrode may have a structure having a mesh substrate carrying the active material, or the like. In the above embodiments, the nonaqueous electrolyte energy storage device which is a nonaqueous electrolyte secondary battery is predominantly described, but any other nonaqueous electrolyte energy storage device is acceptable. Examples of the other nonaqueous electrolyte energy storage device include capacitors (electric double-layer capacitor, lithium ion capacitor), and the like.

Figure 1:
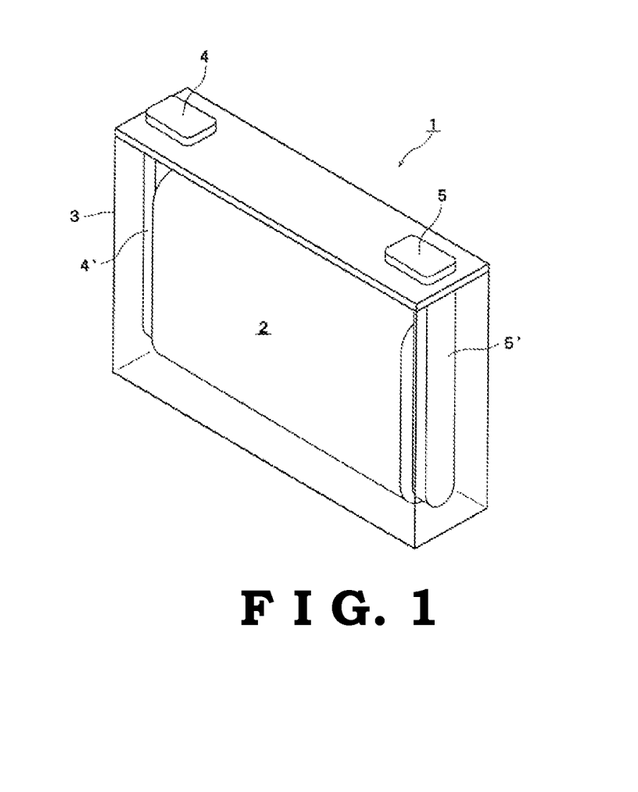
FIG. 1 is an external appearance perspective view showing a nonaqueous electrolyte energy storage device according to one embodiment of the present invention.

FIG. 1 shows a schematic view of a rectangular nonaqueous electrolyte energy storage device 1 (nonaqueous electrolyte secondary battery) of one embodiment of the nonaqueous electrolyte energy storage device according to the present invention. It is to be noted that this Figure is a view showing the inside of a container in a perspective manner. In the nonaqueous electrolyte energy storage device 1 shown in FIG. 1, an electrode group 2 is placed in a container 3. The electrode group 2 is formed by winding a positive electrode and a negative electrode with a separator interposed therebetween, the positive electrode including a positive active material, the negative electrode including a negative active material. The positive electrode is electrically connected to a positive electrode terminal 4 through a positive electrode lead 4', and the negative electrode is electrically connected to a negative electrode terminal 5 through a negative electrode lead 5'. The container 3 is filled with the nonaqueous electrolyte according to the one embodiment of the present invention.

Figure 2:
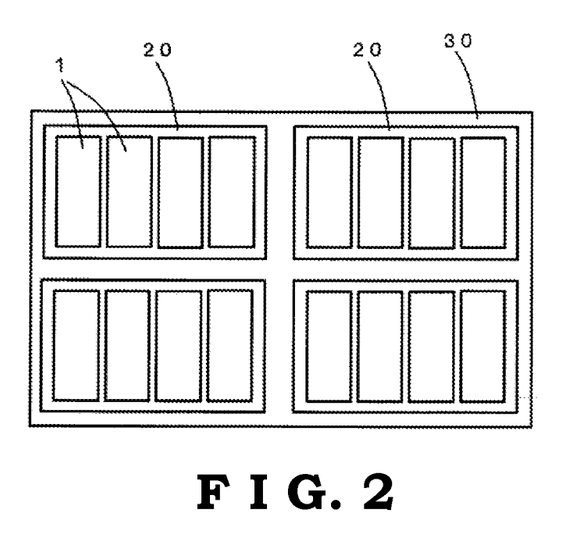
FIG. 2 is a schematic view showing a power storage device in which a plurality of nonaqueous electrolyte energy storage devices according to one embodiment of the present invention are assembled.

The configuration of the nonaqueous electrolyte energy storage device according to the present invention is not particularly limited, and examples thereof include roll-shaped energy storage devices, prismatic energy storage devices (rectangular energy storage devices), flat energy storage devices, and the like. The present invention can also be implemented as a power storage device that includes a plurality of the nonaqueous electrolyte energy storage devices described above. FIG. 2 shows a power storage device according to one embodiment of the present invention. In FIG. 2, a power storage device 30 includes a plurality of power storage units 20. Each power storage unit 20 includes a plurality of nonaqueous electrolyte energy storage devices 1. The power storage device 30 can be mounted as a power source for an automobile such as an electric vehicle (EV), a hybrid electric vehicle (HEV), a plug-in hybrid electric vehicle (PHEV), or the like.

EXAMPLES

Hereinafter, the present invention will be more specifically described by way of Examples, and the present invention is not limited to the following Examples.

Example 1

Preparation of Nonaqueous Electrolyte

Dimethyl carbonate (DMC) as the first solvent, bis(2,2,2-trifluoroethyl) carbonate (FDEC) as the second solvent, and tris(2,2,2-trifluoroethyl) phosphate (TFEP) as the additive were mixed in a volume ratio of 1:3:2 (=16.7% by volume: 50.0% by volume: and 33.3% by volume). Next, 1.00 mol of $LiBF_4$ being an alkali metal salt was added to 1 kg of this mixed solvent and $LiBF_4$ was dissolved to give a nonaqueous electrolyte of Example 1. The content of $LiBF_4$ being an alkali metal salt with respect to the content of the first solvent in terms of a molar ratio was calculated to be 1.35.

Production of Nonaqueous Electrolyte Energy Storage Device

A positive electrode plate with $LiNi_{0.5}Co_{0.2}Mn_{0.3}O_2$ as a positive active material, having a layered α-$NaFeO_2$-type crystal structure was produced. As a negative electrode plate, metal lithium was provided. Next, an electrode group was produced by laminating the positive electrode plate and the negative electrode plate, with a separator interposed therebetween, the separator being composed of a glass filter. This electrode group was placed in a sealable stainless steel case for a battery test, and the case was filled with the nonaqueous electrolyte. The case was then sealed to give a nonaqueous electrolyte energy storage device (lithium ion secondary battery).

Example 2, Comparative Examples 1 to 9

Each nonaqueous electrolyte and each nonaqueous electrolyte energy storage device of Example 2 and Comparative Examples 1 to 9 were obtained in a similar manner to Example 1 except that the type and the content of the alkali metal salt, the first solvent, the second solvent and the additive were as shown in Table 1. In Table 1, each molar ratio of the content of the first solvent to the content of the alkali metal salt is shown together.

Examples 3 to 5, Comparative Examples 10 to 12

Each nonaqueous electrolyte and each nonaqueous electrolyte energy storage device of Examples 3 to 5 and Comparative Examples 10 to 12 were obtained in a similar manner to Example 1 except that: $LiNi_{0.5}Co_{0.2}Mn_{0.3}O_2$ having a layered α-$NaFeO_2$-type crystal structure, which was prepared by employing a synthesis method different from the method for the positive active material used in Example 1, was used as a positive active material; and the type and the content of the alkali metal salt, the first solvent, the second solvent and the additive were as shown in Table 2. In Table 2, each molar ratio of the content of the first solvent to the content of the alkali metal salt is shown together.

Abbreviations in Tables 1 to 3 indicate the following compounds.

First Solvent
DMC: dimethyl carbonate
PC: propylene carbonate
Second Solvent
FDEC: bis(2,2,2-trifluoroethyl) carbonate
MFEC: (2,2,2-trifluoroethyl)methyl carbonate
FEC: fluoroethylene carbonate
HFE: 1,1,2,2-tetrafluoroethyl-2,2,3,3-tetrafluoropropyl ether
TFEE: 1,1,2,2-tetrafluoroethyl-2,2,2-trifluoroethyl ether
Additive
TFEP: tris(2,2,2-trifluoroethyl) phosphate
Evaluations
Capacity Retention Rate
Each nonaqueous electrolyte energy storage device of Examples 1 to 5 and Comparative Examples 1 to 12 thus obtained was subjected to constant current charge at 30° C., with a charge current of 0.1 C and a charge termination voltage of 4.6 V, and with setting of a quiescent period of 1 hour. Thereafter, constant current discharge was carried out with a discharge current of 0.1 C and a discharge termination voltage of 3.0 V, and with setting of a quiescent period of 1 hour. This charge-discharge was performed for 50 cycles. A capacity retention rate (%) was determined from a discharge capacity on the 50th cycle with respect to the discharge capacity on the first cycle. The results are shown in Tables 1 and 2.

TABLE 1

| | Alkali metal salt | | First solvent | | Second solvent | | Additive | | Content of first solvent with respect to content of alkali metal salt (molar ratio) | Capacity retention rate (%) |
|---|---|---|---|---|---|---|---|---|---|---|
| | type | content (mol/kg) | type | content (% by volume) | type | content (% by volume) | type | content (% by volume) | | |
| Example 1 | LiBF$_4$ | 1.00 | DMC | 16.7 | FDEC | 50.0 | TFEP | 33.3 | 1.35 | 98.4 |
| Example 2 | LiBF$_4$ | 1.00 | PC | 16.7 | FDEC | 50.0 | TFEP | 33.3 | 1.33 | 98.0 |
| Comparative Example 1 | LiBF$_4$ | 0.93 | DMC | 100.0 | — | — | — | — | 11.8 | 82.2 |
| Comparative Example 2 | LiBF$_4$ | 8.67 | DMC | 100.0 | — | — | — | — | 1.28 | 92.2 |
| Comparative Example 3 | LiBF$_4$ | 7.71 | DMC/PC | 50.0/50.0 | — | — | — | — | 1.35 | 94.7 |
| Comparative Example 4 | LiBF$_4$ | 0.83 | PC | 100.0 | — | — | — | — | 11.8 | 73.1 |
| Comparative Example 5 | LiBF$_4$ | 7.25 | PC | 100.0 | — | — | — | — | 1.35 | 94.0 |
| Comparative Example 6 | LiBF$_4$ | 1.52 | DMC | 50.0 | FDEC | 50.0 | — | — | 3.00 | 90.5 |
| Comparative Example 7 | LiBF$_4$ | 1.52 | DMC | 50.0 | HFE | 50.0 | — | — | 3.00 | 93.1 |
| Comparative Example 8 | LiBF$_4$ | 1.52 | DMC | 50.0 | TFEE | 50.0 | — | — | 3.00 | 90.9 |
| Comparative Example 9 | LiBF$_4$ | 1.49 | DMC | 50.0 | — | — | TFEP | 50.0 | 3.00 | 33.6 |

TABLE 2

| | Alkali metal salt | | First solvent | | Second solvent | | Additive | | Content of first solvent with respect to content of alkali metal salt (molar ratio) | Capacity retention rate (%) |
|---|---|---|---|---|---|---|---|---|---|---|
| | type | content (mol/kg) | Type | content (% by volume) | type | content (% by volume) | Type | content (% by volume) | | |
| Example 3 | LiBF$_4$ | 1.00 | DMC | 16.7 | FDEC | 50.0 | TFEP | 33.3 | 1.35 | 88.5 |
| Example 4 | LiBF$_4$ | 1.00 | PC | 16.7 | FDEC | 50.0 | TFEP | 33.3 | 1.33 | 93.6 |
| Example 5 | LiPF$_6$ | 1.00 | DMC | 16.7 | FDEC | 50.0 | TFEP | 33.3 | 1.35 | 77.7 |
| Comparative Example 10 | LiBF$_4$ | 0.93 | DMC | 100.0 | — | — | — | — | 11.8 | 53.1 |
| Comparative Example 11 | LiBF$_4$ | 0.45 | DMC | 16.7 | FDEC | 50.0 | TFEP | 33.3 | 3.00 | 13.2 |
| Comparative Example 12 | LiBF$_4$ | 0.27 | DMC | 16.7 | FDEC | 50.0 | TFEP | 33.3 | 5.00 | 0.0 |

As shown in Table 1 above, the capacity retention rate was elevated in Comparative Examples 2, 3 and 5, which included a high concentration of the alkali metal salt, as compared with Comparative Examples 1 and 4; however, the capacity retention rate was not so great as to exceed 95%. Also in Comparative Examples 6 to 8, wherein the first solvent was diluted by adding the second solvent, the capacity retention rate was not improved sufficiently. In Comparative Example 9, wherein the first solvent was diluted by adding the additive, the capacity retention rate was very low. To the contrary, a greatly increased capacity retention rate was proven in Examples 1 and 2, in each of which the nonaqueous electrolyte containing, in addition to the first solvent and the second solvent, the additive further mixed therewith that included a polar group and a group including a fluorine atom was used.

As shown in Table 2 above, the capacity retention rate was very low in Comparative Examples 11 and 12, in which the content of the alkali metal salt in the nonaqueous electrolyte was very low, and the content of the first solvent with respect to the content of the alkali metal salt was very high. To the contrary, an increased capacity retention rate was proven in Examples 3 to 5, in which the nonaqueous electrolyte containing the alkali metal salt, the first solvent, the second solvent and the additive in a certain proportion was employed. In particular, a particularly increased capacity retention rate was proven in Examples 3 and 4, in which LiBF$_4$ was used as the alkali metal salt.

Raman Spectrum Measurement of Nonaqueous Electrolyte

Each nonaqueous electrolyte of Example 1 and Comparative Example 1 thus obtained, and DMC that was the first solvent of these nonaqueous electrolytes, were included in a quartz cell for a spectrophotometer having an optical path length of 1 cm, and a Raman spectrum was measured under the following conditions.

apparatus employed: LabRAM HR Revolution manufactured by Horiba, Ltd.
excitation laser wavelength: 785 nm
exposure time: 10 sec
number of integration: 30 times As a result, on the Raman spectrum of DMC that was the first solvent, one Raman band which was inherent to a C—O stretching band was observed at around 915 cm$^{-1}$. On the Raman spectrum of the nonaqueous electrolyte of Comparative Example 1, in addition to the band at around 915 cm$^{-1}$, a shoulder peak band was observed at around 935 cm$^{-1}$, and the peak area ratio was about 88:12. On the Raman spectrum of the nonaqueous electrolyte of Example 1, two Raman bands were observed at around 915 cm$^{-1}$ and around 935 cm$^{-1}$, and the peak area ratio was about 57:43. From these results, it was revealed that in both Example 1 and Comparative Example 1, at least a part of DMC had coordinated to a lithium ion constituting LiBF$_4$ that was the alkali metal salt.

Although DMC that was the first solvent not having solvated, and DMC that was the first solvent having coordinated to a lithium ion were both present in the nonaqueous electrolyte of Comparative Example 1, it was revealed that a majority of DMC had failed to coordinate to a lithium ion. On the other hand, although DMC that was the first solvent not having solvated, and DMC that was the first solvent having coordinated to a lithium ion were both present in the nonaqueous electrolyte of Example 1, it was revealed that more of DMC had coordinated to a lithium ion irrespective of having an alkali metal salt concentration similar to that of the nonaqueous electrolyte of Comparative Example 1.

On the Raman spectrum of the nonaqueous electrolyte of Comparative Example 1, two Raman bands were further observed at around 766 cm$^{-1}$ and around 774 cm$^{-1}$, and the peak area ratio was about 50:50. From these results, it was revealed that LiBF$_4$ in a completely dissociated state and LiBF$_4$ in a state of forming the ion pair or the cluster were both present in the nonaqueous electrolyte of Comparative Example 1. On the contrary, on the Raman spectrum of the nonaqueous electrolyte of Example 1, one Raman band was observed at around 774 cm$^{-1}$, and a Raman band was hardly observed at around 766 cm$^{-1}$. This peak area ratio was about 5:95. From these results, it was revealed that in the nonaqueous electrolyte of Example 1, a majority of LiBF$_4$ was present in a state of substantially forming the ion pair or the cluster.

Example 6

Preparation of Nonaqueous Electrolyte

Propylene carbonate (PC) as the first solvent, bis(2,2,2-trifluoroethyl) carbonate (FDEC) and fluoroethylene carbonate (FEC) as the second solvent, and tris(2,2,2-trifluoroethyl) phosphate (TFEP) as the additive were mixed in a volume ratio of 15.6:46.9:6.3:31.2 (PC:FDEC:FEC:TFEP). Next, 1.00 mol of LiBF$_4$ being an alkali metal salt was added to 1 kg of this mixed solvent and LiBF$_4$ was dissolved to give a nonaqueous electrolyte of Example 1. The content of LiBF$_4$ being an alkali metal salt with respect to the content of the first solvent in terms of a molar ratio was calculated to be 1.20.

Production of Nonaqueous Electrolyte Energy Storage Device

A positive electrode plate with LiN$_{1/3}$Co$_{1/3}$Mn$_{1/3}$O$_2$ as a positive active material, having a layered α-NaFeO$_2$-type crystal structure was produced. A negative electrode plate was produced with graphite as a negative active material. Next, an electrode group was produced by winding the positive electrode plate and the negative electrode plate, with a separator interposed therebetween, the separator being composed of a fine porous polyolefin film. This electrode group was placed in a sealable aluminum case for a battery test, and the case was filled with the nonaqueous electrolyte. The case was then sealed to give a nonaqueous electrolyte energy storage device (lithium ion secondary battery).

Examples 7 to 10

Each nonaqueous electrolyte and each nonaqueous electrolyte energy storage device of Examples 7 to 10 were obtained in a similar manner to Example 6 except that the type and the content of the alkali metal salt, the first solvent, the second solvent and the additive were as shown in Table 3. In Table 3, each molar ratio of the content of the first solvent to the content of the alkali metal salt is shown together.

Evaluations

Capacity Retention Rate

Each nonaqueous electrolyte energy storage device of Examples 6 to 10 thus obtained was subjected to constant current/constant voltage charge at 25° C., with a charge current of 0.15 C, a charge termination voltage of 4.50 V and a total charge time of 10 hrs, and with setting of a rest time of 10 min. Thereafter, constant current discharge was carried out with a discharge current of 0.15 C and a discharge termination voltage of 2.75 V, and with setting of a rest time of 10 min. This charge-discharge was performed for 2 cycles, thereby completing initial charge-discharge. After the initial charge-discharge, a charge-discharge cycle test was conducted under the following conditions. Constant current/constant voltage charge was carried out at 45° C. with a charge current of 0.15 C, a charge termination voltage of 4.50 V and a total charge time of 10 hrs, and with setting of a rest time of 10 min. Thereafter, constant current discharge was carried out with a discharge current of 0.15 C and a discharge termination voltage of 2.75 V, and with setting of a rest time of 10 min. This charge-discharge was performed for 40 cycles. A capacity retention rate (%) was determined from a discharge capacity on the 40th cycle with respect to the discharge capacity on the first cycle. The results are shown in Table 3.

TABLE 3

| | Alkali metal salt | | First solvent | | Second solvent | | Additive | | Content of first solvent with respect to content of alkali metal salt (molar ratio) | Capacity retention rate (%) |
|---|---|---|---|---|---|---|---|---|---|---|
| | type | content (mol/kg) | type | content (% by volume) | type | content (% by volume) | type | content (% by volume) | | |
| Example 6 | LiBF$_4$ | 1.00 | PC | 15.6 | FDEC | 46.9 | TFEP | 31.2 | 1.20 | 96.4 |
| | | | — | — | FEC | 6.3 | — | — | | |
| Example 7 | LiBF$_4$ | 1.00 | PC | 15.4 | MFEC | 46.3 | TFEP | 31.0 | 1.20 | 92.4 |
| | | | — | — | FEC | 7.3 | — | — | | |
| Example 8 | LiBF$_4$ | 1.00 | PC | 9.3 | MFEC | 69.5 | TFEP | 13.9 | 0.72 | 93.5 |
| | | | — | — | FEC | 7.3 | — | — | | |

TABLE 3-continued

| | Alkali metal salt | | First solvent | | Second solvent | | Additive | | Content of first solvent with respect to content of alkali metal | Capacity |
|---|---|---|---|---|---|---|---|---|---|---|
| | type | content (mol/kg) | type | content (% by volume) | type | content (% by volume) | type | content (% by volume) | salt (molar ratio) | retention rate (%) |
| Example 9 | LiBF$_4$ | 1.00 | DMC | 15.6 | FDEC | 46.9 | TFEP | 31.3 | 1.30 | 50.5 |
| | | | | | FEC | 6.2 | | | | |
| Example 10 | LiBF$_4$ | 1.00 | DMC | 15.4 | MFEC | 46.4 | TFEP | 31.0 | 1.30 | 29.4 |
| | | | | | FEC | 7.2 | | | | |

As shown in Table 3 above, Examples 6 to 8, in which PC was used as the first solvent, exhibited a higher capacity retention rate compared with Examples 9 to 10, in which DMC was used as the first solvent. Such a difference is speculated to result from superior resistance to oxidization of PC as compared with DMC. Comparison of Examples 6 to 8 indicates that Example 6, in which FDEC was used as a compound in the second solvent, exhibited a particularly high capacity retention rate.

In Tables 1 and 2, the difference in the capacity retention rate was small between PC and DMC, whereas in Table 3, a remarkable difference was generated between PC and DMC. The reason for these events is envisaged as follows. In each Example shown in Table 3 above, the aluminum case was used for the nonaqueous electrolyte energy storage device, and the charge-discharge cycle test at 45° C. was conducted. To the contrary, in each Example and Comparative Example shown in Tables 1 to 2 above, the stainless steel case was used for the nonaqueous electrolyte energy storage device, and the charge-discharge cycle test at 30° C. was conducted. During the charge-discharge, it is known that generation of a gas resulting from a side reaction may occur, thereby leading to performance deterioration of the nonaqueous electrolyte energy storage device. When a soft and easily deformable aluminum case is used, elevation of the internal pressure by generation of the gas is relatively liable to affect the case, leading to deformation of the case being likely to occur. In the case of the soft aluminum case, alteration of the thickness of the energy storage device caused by expansion/contraction of the electrode is liable to affect the case. Moreover, repeating of the charge-discharge at a high temperature tends to cause lowering of the capacity retention rate. In these respects, as compared with each Example and Comparative Example shown in Tables 1 to 2 above, each Example shown in Table 3 above is considered to be evaluated under conditions which can readily cause lowering of the capacity retention rate. Consequently, the difference in the first solvent is prominently indicated to lead to the difference in the effects.

INDUSTRIAL APPLICABILITY

The present invention is applicable to nonaqueous electrolyte energy storage devices to be used as power sources for automobiles, and electronic instruments such as personal computers and communication terminals.

DESCRIPTION OF REFERENCE SIGNS 1 nonaqueous electrolyte energy storage device
2 electrode group
3 container
4 positive electrode terminal
4' positive electrode lead
5 negative electrode terminal
5' negative electrode lead
20 power storage unit
30 power storage device

The invention claimed is:

1. A nonaqueous electrolyte for an energy storage device comprising:
  an alkali metal salt;
  a first aprotic organic solvent coordinating to an alkali metal ion in the alkali metal salt, and not including a fluorine atom;
  a second aprotic organic solvent including a fluorine atom; and
  an additive comprising a polar group and a group including a fluorine atom,
  wherein
  a content of the alkali metal salt is no less than 0.9 mol/kg and less than 2 mol/kg,
  a content of the first aprotic organic solvent with respect to the content of the alkali metal salt in terms of a molar ratio is no less than 0.7 and no greater than 4, and
  a content of the second aprotic organic solvent with respect to a total amount of the first aprotic organic solvent, the second aprotic organic solvent and the additive is no less than 40% by volume.

2. The nonaqueous electrolyte according to claim 1, wherein the polar group comprises a phosphoric acid ester group, a nitric acid ester group or a sulfuric acid ester group.

3. The nonaqueous electrolyte according to claim 1, wherein the first aprotic organic solvent comprises a carbonate not including a fluorine atom.

4. The nonaqueous electrolyte according to claim 1, wherein the first aprotic organic solvent comprises a cyclic carbonate not including a fluorine atom.

5. The nonaqueous electrolyte according to claim 1, wherein the first aprotic organic solvent comprises propylene carbonate.

6. The nonaqueous electrolyte according to claim 1, wherein the second aprotic organic solvent comprises a fluorinated linear carbonate, a fluorinated ether or a combination thereof.

7. The nonaqueous electrolyte according to claim 1, wherein the additive comprises a fluorinated phosphoric acid ester.

8. The nonaqueous electrolyte according to claim 1, wherein a content of the additive with respect to a total amount of the first aprotic organic solvent, the second aprotic organic solvent and the additive is no less than 5% by volume and less than 50% by volume.

9. The nonaqueous electrolyte according to claim 1, which does not substantially comprise ethylene carbonate.

10. The nonaqueous electrolyte according to claim 1, wherein the content of the first aprotic organic solvent with respect to the content of the alkali metal salt in terms of the molar ratio is no less than 1 and no greater than 4.

11. A nonaqueous electrolyte energy storage device comprising the nonaqueous electrolyte according to claim 1.

12. The energy storage device according to claim 11, further comprising a positive electrode which comprises $Li_xNi_\alpha Co_\beta Mn_\gamma M_{(1-\alpha-\beta-\gamma)}O_2$ (wherein: M represents a metal element other than Ni, Mn or Co; $0<x\leq 1.2$; $0.3\leq\alpha\leq 0.8$; $0\leq\beta\leq 0.4$; $0\leq\gamma\leq 0.4$; and $(\alpha+\beta+\gamma)\leq 1$) that has a layered $\alpha$-NaFeO$_2$-type crystal structure.

* * * * *